(12) United States Patent
Hutton et al.

(10) Patent No.: US 9,164,700 B2
(45) Date of Patent: Oct. 20, 2015

(54) SYSTEM FOR OPTIMIZING THE TRANSFER OF STORED CONTENT IN RESPONSE TO A TRIGGERING EVENT

(75) Inventors: Henry Hutton, Tracy, CA (US); Judah Gamliel Hahn, Ofra (IL); Daniel Isaac Goodman, Beit Shemesh (IL)

(73) Assignee: SanDisk IL LTD, Kfar Saba (IL)

( * ) Notice: Subject to any disclaimer, the term of this patent is extended or adjusted under 35 U.S.C. 154(b) by 751 days.

(21) Appl. No.: 12/398,617

(22) Filed: Mar. 5, 2009

(65) Prior Publication Data
US 2010/0228799 A1 Sep. 9, 2010

(51) Int. Cl.
G06F 7/00 (2006.01)
G06F 17/30 (2006.01)
G06F 3/06 (2006.01)

(52) U.S. Cl.
CPC ............ *G06F 3/0665* (2013.01); *G06F 3/0607* (2013.01); *G06F 3/0643* (2013.01); *G06F 3/0679* (2013.01); *G06F 17/30091* (2013.01)

(58) Field of Classification Search
None
See application file for complete search history.

(56) References Cited

U.S. PATENT DOCUMENTS

| | | | |
|---|---|---|---|
| 6,067,545 A * | 5/2000 | Wolff | 1/1 |
| 6,148,363 A | 11/2000 | Lofgren et al. | |
| 6,647,479 B1 | 11/2003 | Laws | |
| 6,647,481 B1 * | 11/2003 | Luu et al. | 711/206 |
| 7,356,679 B1 * | 4/2008 | Le et al. | 713/1 |
| 7,409,494 B2 * | 8/2008 | Edwards et al. | 711/114 |
| 7,484,070 B1 * | 1/2009 | Walton et al. | 711/202 |
| 7,562,176 B2 * | 7/2009 | Kloeppner et al. | 710/314 |
| 8,122,179 B2 * | 2/2012 | Lin et al. | 711/103 |
| 2004/0268084 A1 * | 12/2004 | Longerbeam et al. | 711/206 |
| 2006/0004759 A1 * | 1/2006 | Borthakur et al. | 707/9 |
| 2006/0200508 A1 * | 9/2006 | Telkowski et al. | 707/204 |
| 2006/0276171 A1 * | 12/2006 | Pousti | 455/405 |
| 2007/0136548 A1 * | 6/2007 | Mane | 711/170 |
| 2007/0300009 A1 * | 12/2007 | Rogers et al. | 711/103 |
| 2008/0010243 A1 * | 1/2008 | Weissman et al. | 707/2 |
| 2009/0006713 A1 * | 1/2009 | Royer et al. | 711/6 |
| 2009/0193184 A1 * | 7/2009 | Yu et al. | 711/103 |
| 2010/0082700 A1 * | 4/2010 | Parab | 707/803 |
| 2010/0082714 A1 * | 4/2010 | Herron et al. | 707/822 |
| 2010/0138406 A1 * | 6/2010 | Seo et al. | 707/713 |
| 2011/0119390 A1 * | 5/2011 | Leech et al. | 709/228 |

OTHER PUBLICATIONS

International Search Report issued in international application No. PCT/US2010/025400, mailed May 10, 2010 (6 pages).
Written Opinion issued in international application No. PCT/US2010/025400, mailed May 10, 2010 (7 pages).

* cited by examiner

*Primary Examiner* — Michael Hicks
(74) *Attorney, Agent, or Firm* — Brinks Gilson & Lione (57) ABSTRACT

A system is set forth that includes storage, a first file system, a second file system, and a processing system. The first file system manages one or more files and/or directories on the storage, while the second file system manages content of one or more further files on the storage. The processing system is responsive to a triggering event. The processing system responds to the triggering event by re-mapping content from the second file system to the first file system while retaining the content at its original physical location on the storage so that the content is accessible through the first file system from its original physical location on the storage.

29 Claims, 11 Drawing Sheets

Directory Area in the Re-mapped Native File System
510

| DOS Filename | Ext | Attributes | FCN (high) | FCN (low) | Size |
|---|---|---|---|---|---|
| "LOOP" | "FS" | 22 | 0000 | 0004 | 0006 FFF2 |
| "FILE1" | "AVI" | 20 | 0000 | 0008 | 0001 7FFD |

FAT in the Re-mapped Native File System
505

| F8FF FFFF | 0000 0000 | 0000 0003 | 0FFF FFFF | 0000 0005 | 0000 0006 |
|---|---|---|---|---|---|
| 0000 0007 | 0000 0012 | 0000 0009 | 0000 000A | 0FFF FFFF | 0000 000C |
| 0000 000D | 0000 000E | 0000 000F | 0000 0010 | 0000 0011 | 0FFF FFFF |
| 0000 0013 | 0000 0014 | 0000 000B | 0000 0000 | 0000 0000 | 0000 0000 |

SYSTEM FOR OPTIMIZING THE TRANSFER OF STORED CONTENT IN RESPONSE TO A TRIGGERING EVENT

BACKGROUND

1. Technical Field

The present application is directed to a storage device and, more particularly, to a system for optimizing the transfer of stored memory content in response to a triggering event.

2. Related Art

Files may be written to a removable storage device using an out-of-band channel that is not under the direct control of a user and/or host operating system. For example, the files may be written to a hidden partition of the removable storage device, where the user is neither aware of the existence of the files nor able to access the contents of the files. The files may then be selectively exposed to the host operating system and/or user when the user carries out certain actions to access the content of the files.

Mechanisms for moving the content of a file in a hidden partition to an accessible portion of the removable storage device may be complex. One such mechanism involves a direct copy operation in which all the content from the hidden partition is directly copied to an accessible portion of the removable storage device. In such a direct copy operation, the host operating system reads the content from the hidden partition and then writes it again to and accessible portion of the removable storage device, such as a public partition. Besides being computationally costly, this mechanism requires the existence of a user-inaccessible hidden partition of sufficient size to hold the content. Users may resist paying for a storage device in which a significant portion of the storage is not visible and under their direct control.

SUMMARY

A system is set forth that includes storage, a first file system, a second file system, and a processing system. The first file system manages one or more file and/or directories on the storage, while the second file system manages content of one or more further files on the storage. The processing system is responsive to a triggering event. The processing system responds to the triggering event by re-mapping content from the second file system to the first file system while keeping the content at its original physical location on the storage so the content is accessible through the first file system from its original physical location on the storage.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The components in the figures are not necessarily to scale, emphasis instead being placed upon illustrating the principles of the invention. Moreover, in the figures, reference numerals having the same values designate corresponding parts throughout the different views.

DETAILED DESCRIPTION OF THE PREFERRED EMBODIMENTS

Figure 1:
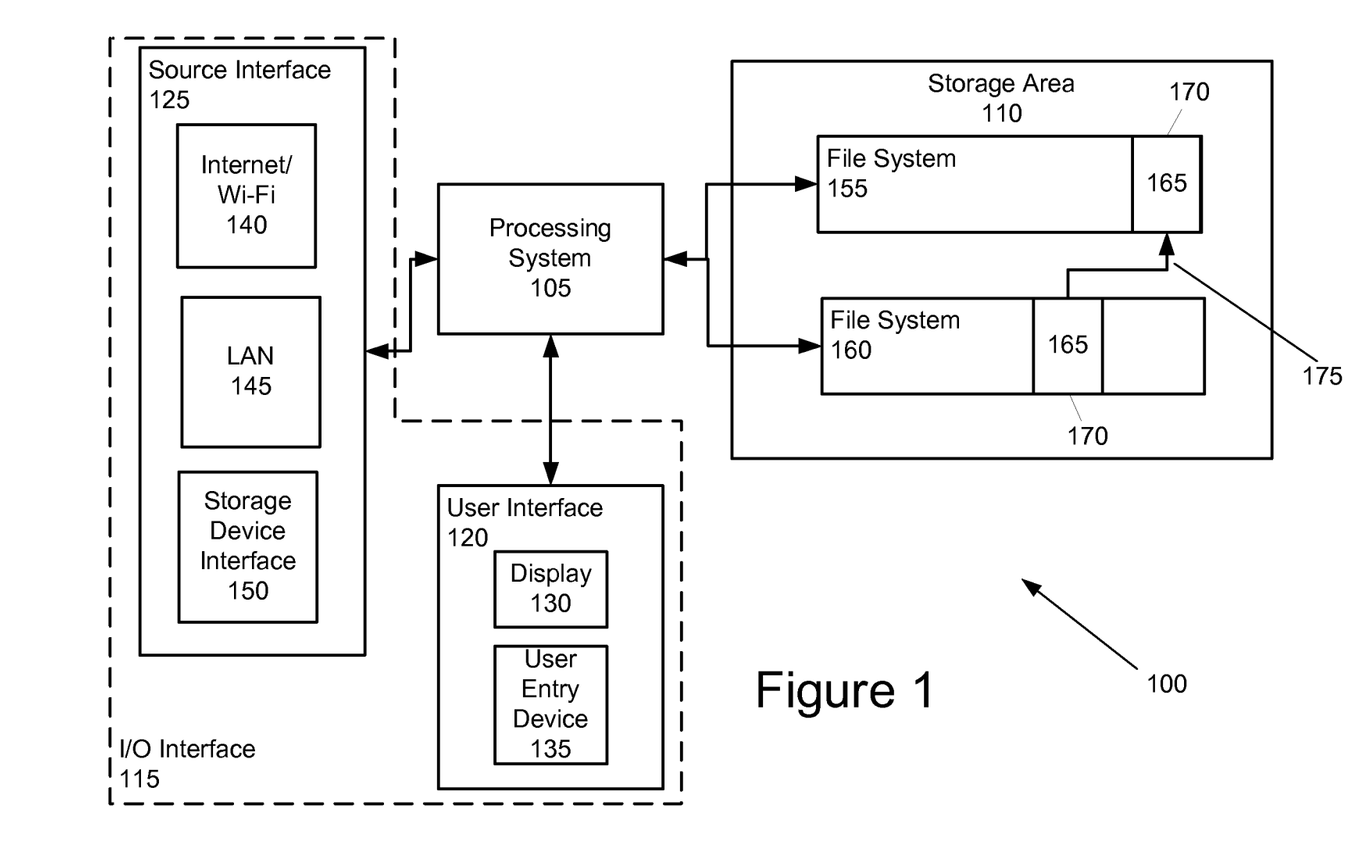
FIG. 1 is a block diagram of a system in which stored content is re-mapped in response to a triggering event.

FIG. 1 is a block diagram of a system 100 in which stored content is re-mapped in response to a triggering event. System 100 includes a processing system 105 that interacts with a memory storage area 110 and an I/O interface 115. The processing system 105 may be include one or more microprocessors, an operating system code, application code, or any processing components suitable for implementing the overall functionality of the system 100. The memory storage area 110 may be present on a persistent storage medium, such as a disk drive, non-volatile memory (i.e., FLASH memory), or the like.

The I/O 115 interface may be local or remote. A remote I/O interface 115 may include components of a remote network and/or host system that are used to interface with the processing system 105. In the case of a local I/O interface 115, the I/O interface 115 may include a user interface 120 that allows a user to interact with the processing system 105. The user interface may comprise any number of components facilitating access by the user. In FIG. 1, the user interface includes a display 130 and a data/command entry device 135. The display 130 may be an LCD, LED, touch screen, or any other display component that may provide visual information provided by the processing system 105 to the user. The data/command entry device 135 may comprise a touch screen, as well as any number of real and/or virtual controls (i.e., buttons, knobs, sliders, rotatable dials) or any other interface component that may be employed by the user to provide data and/or commands to the processing system 105.

The I/O interface 115 of system 100 also includes a data source interface 125 comprised of one or more components that may be used by the processing system 105 to acquire file content, which content may be stored in the storage area 110. In FIG. 1, the data source interface 125 includes an Internet/WiFi interface 140, a local area network (LAN) interface 145, and/or a storage device interface 150. The Internet/WiFi interface 140 may be used to obtain, for example, subscription content including, but not limited to, audio content and/or video content for various programs. The LAN interface 145 may be used to access content from one or more wired and/or wireless devices connected to a local area network. Storage device interface 150 may be used to transfer content from a local storage device that is directly connected to the system 100 to the storage area 110.

The processing system 105 is operative to respond to a triggering event. The triggering event may include, for example, an interrupt, setting a flag/register that is accessible to the processing system 105, or other manner of notifying the processing system 105 that a particular type of event has occurred. Actions that cause the triggering events may include actions taken by a user, event information received through the I/O interface 115, or the like.

Storage area 110 includes a first file system 155 for managing one or more file and/or directories, and a second file system 160 for managing content of one or more further files, shown here as the content of file 165. In response to the triggering event, the processing system 105 re-maps content from the second file system 160 to the first file system 155 while retaining the content at its original physical location in the storage area 110. The re-mapped content is then available for access through the first file system. Both file systems 155 and 160 may be directly accessible to the user. In one embodiment, however, only the content of the first file system 155 may be accessible to the user while the content of the second file system 160 is not directly accessible to the user.

In FIG. 1, an example of the re-mapping operation is shown with respect to the content of file 165. In response to the triggering event, the processing system 105 re-maps the content of file 165 from the second file system 160 to the first file system 155. The re-mapping operation is illustrated by line 175. The content of the file 165, however, remains at its original physical location 170 in the storage area 110. As such, a direct copy of the wanted content of file 165 from the second file system 160 to the first file system 155 need not be performed.

The entirety of the content of the file 165 may be re-mapped from the second file system 160 to the first file system 155. Alternatively, less than all the content of the file 165 may be may be re-mapped from the second file system 160 to the first file system 155. In this latter instance, the re-mapping operation may leave residual content of the file 165 in the second file system 160. The processing system 105 may deallocate the residual content from the second file system 160 so the physical memory storage occupied by the residual content is made available for use by the first and/or second file systems 155 and 160.

Figure 2:
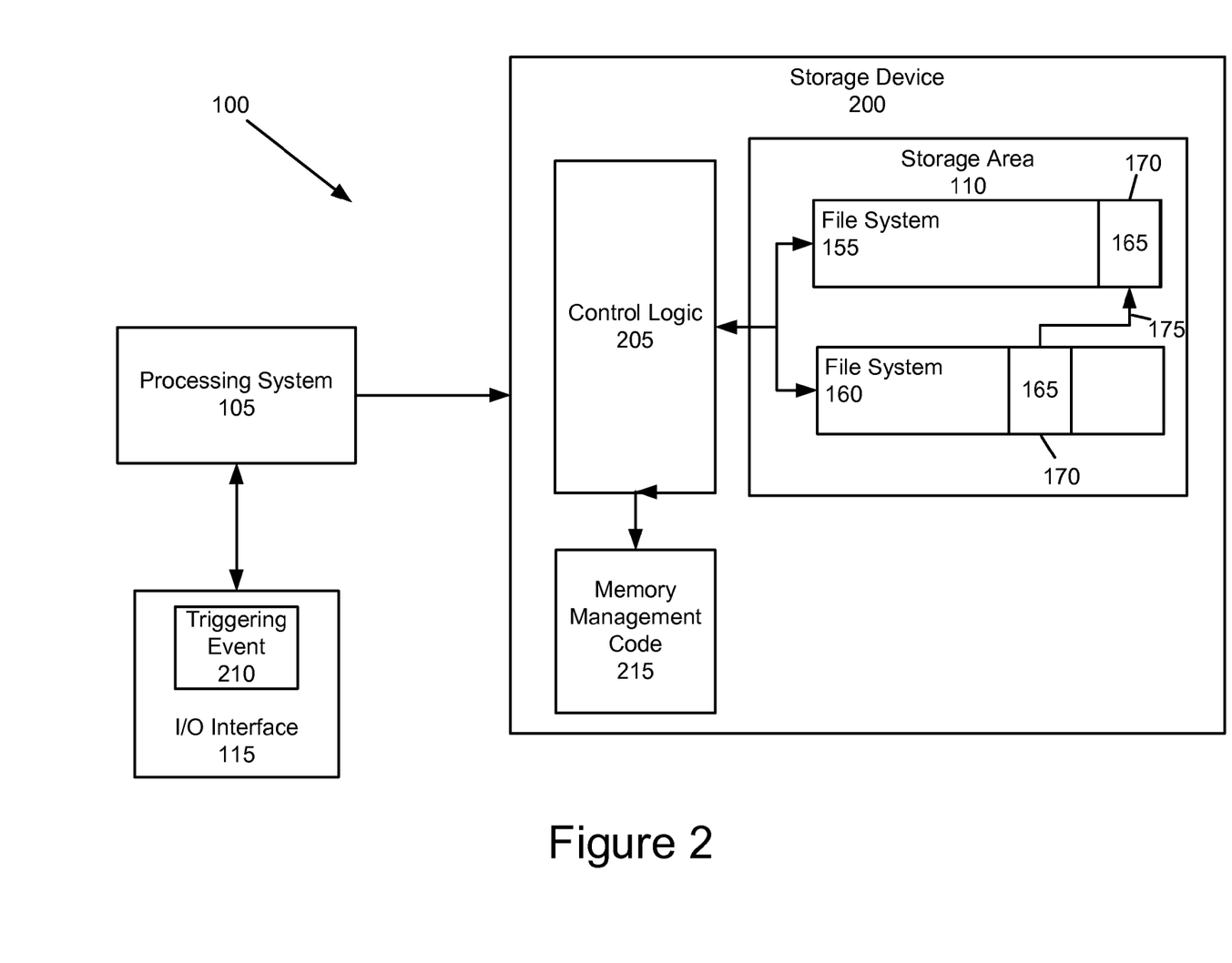
FIG. 2 is a block diagram of a further system in which stored content is re-mapped in response to a triggering event.

Another embodiment of system 100 is shown in FIG. 2. In this embodiment, storage area 110 is integrated in a storage device 200, such as a non-volatile memory storage device (i.e., FLASH device). Storage device 200 also includes control logic 205 that is operative to provide an interface between the processing system 105 and storage area 110. The control logic 205 may include hardware, software, and/or firmware components used to store and retrieve the content of the storage area 110 as well as for performing erase operations. As above, the processing system 105 is responsive to a triggering event 210 that, for example, may be provided from and/or through the I/O interface. The control logic 205 interfaces with the processing system 105 to retain in place the data content of file 165 while re-mapping 175 the content from the second file system 160 to the first file system 155.

Storage device 200 may also include memory management code 215 that is integrated with the storage device 200. The memory management code 215 may be executed by the processing system 105 to respond to the triggering event 210 and to re-map the content from the second file system 160 to the first file system 155 in response to the triggering event 210. The processing system 105 may execute the memory management code 215 directly from the storage device 200 through the control logic 205. Also, or in the alternative, the entirety or portions of the memory management code 215 may be downloaded from storage device 202, for example, memory of the processing system 105 from which the processing system 105 may execute the downloaded code.

Figure 3A:
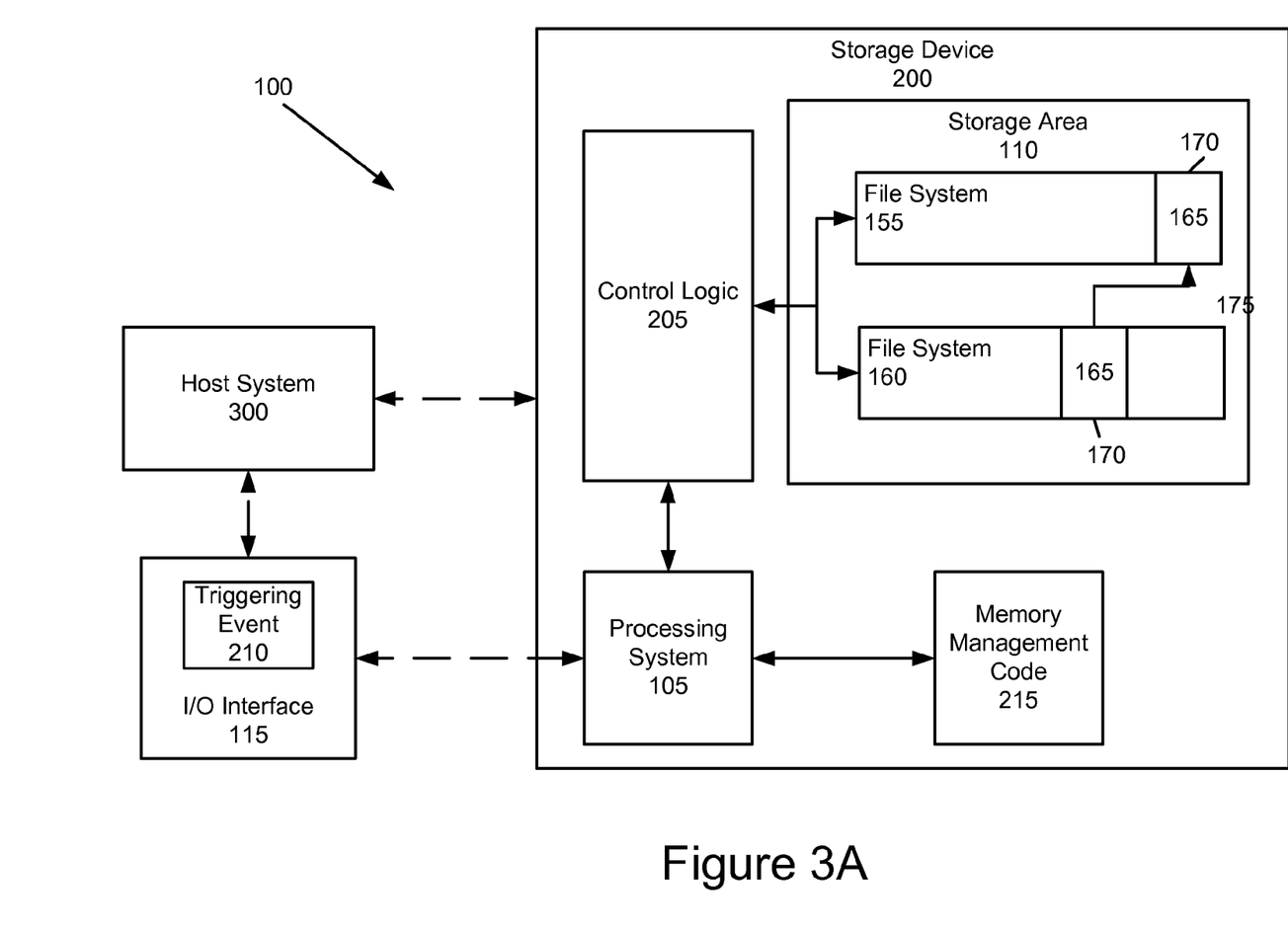
FIG. 3A is a block diagram of a still further system in which stored content is re-mapped in response to a triggering event.

FIG. 3A is a block diagram of a still further embodiment of system 100. In FIG. 3, the processing system 105 is integrated with the storage device 200. The memory management code 215 may be integrated with the storage device 200 or accessible for execution from an external memory by the processing system 105. Here, the memory management code 215 is integrated with the storage device for direct execution by the processing system 105.

The various operations associated with receipt of content from a content source, the generation of the triggering event, the re-mapping operations, and other functionality of system 100 may be completely performed by the processing system 105. Also, or in the alternative, these operations may be divided between the processing system 105 and a host system 300. For example, host system 300 may be used to control the operations of the I/O interface 115 and to provide the triggering event 210 to the storage device 200. Further, the host system 300 may receive contents through the I/O interface 115 and communicate that content for storage by the processing system 105 in the first file system 155 and/or second file system 160. Therefore, the memory management code 215 may include code solely used by the processing system 105 or code that is used by both the host system 300 and processing system 105. Alternatively, the host system 300 may download the memory management code 215 from a location that is then stored in the storage device 200 for execution by the processing system 105. Still further, in another embodiment, the memory management code 215 may be located in storage that is external to the storage device 200, such as in the host system 300, where it is directly executed by the processing system 105. Other arrangements and distributions of the system functions between the various components of FIG. 1 through FIG. 3 may also be employed.

Figure 3B:
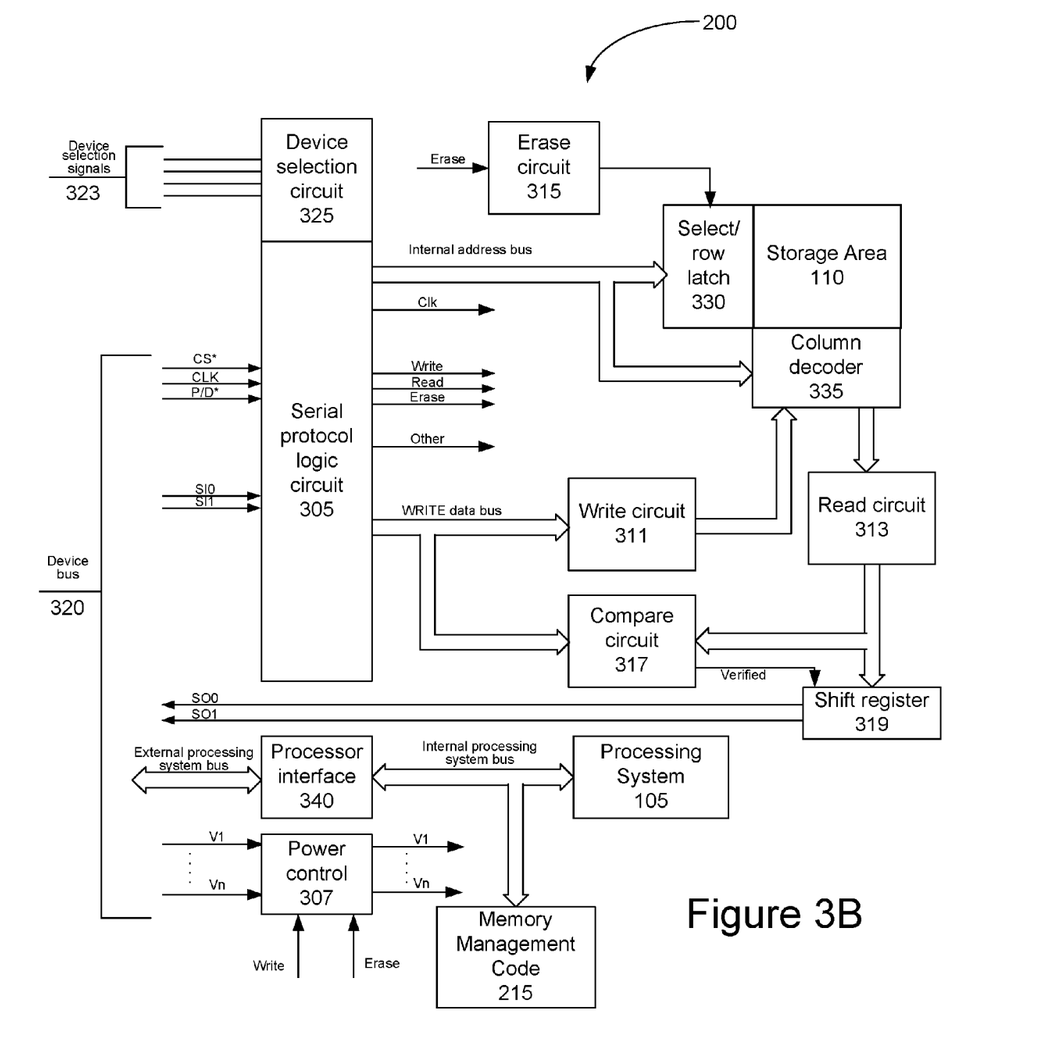
FIG. 3B is a diagram of the functional blocks of one embodiment of a flash EEPROM memory device that may be used as the storage device of FIG. 2 and FIG. 3A.

The memory storage device 200 may be implemented in a wide variety of manners. FIG. 3B is a diagram of the functional blocks of one embodiment of a flash EEPROM memory device that may be used as the storage device 200. The storage device 200 may include an addressable flash EEPROM cell array that operates as the storage area 110, a serial protocol logic circuit 305, a power control circuit 307, and various WRITE, READ, ERASE circuits 311, 313, 315, 317, and 319.

Referring to FIG. 3B, the storage device 200 may be adapted to receive a plurality of external signals. A first group of external signals may be provided on the lines of a device bus 320. The device bus 320 may include a timing signal line, CLK, a control signal line P/D*, two serial input lines, SI0, SI1, two serial output lines, SO0, SO1, and a set of power lines V1 . . . Vn. Another control signal line, chip select CS* is shown outside the device bus 135, although in some embodiments, it may be regarded as part of the device bus 320. A second group of external signals includes one or more device selection signals.

The storage device 200 may be enabled for operation whenever the CS* signal is asserted. In the embodiment of FIG. 3B, the storage device 200 may be enabled in one of two ways. The first is through a "master-select" mode in which a special signal configuration of the device selection signals 323 provided to the device selection circuit 325 is employed. A predetermined signal state configuration of the device selection signals 323 may be reserved for a "master select"

mode, which unconditionally allows the storage device 200 to be selected or enabled. This allows a group of storage devices with this "master select" configuration to be selected together on a common device backplane. Further, it may be used to allow for radial selection of individual devices on the common device bus.

The second way is through an "address-select" mode in which the storage device 200 is enabled by shifting in an address from the serial input lines SI0 and SI1 that matches the address defined by the device selection signals 323. This allows the storage device 200 to be used in an array of storage devices on a common backplane in which the address for each device in the array may be defined by a grounding configuration of the device selection signals 323. Whenever a storage device 200 is to be selected, its address in the array of storage devices is made available on the device bus 320. The compare circuit 317 executes the address-matching operation based on signals received from the serial protocol logic circuit 305 and device selection circuit 325.

After the storage device 200 has been addressed and enabled, read or write operations may be performed on it. A stream of serialized addresses, data, and commands is then passed from an external device to the storage device 200 over the device bus 320. At the storage device 200, the serial protocol logic circuit 305 may be used to sort out, re-organize and re-route the various information in the serial stream to the appropriate destinations within the device 200. The serial protocol logic circuit 305 may sort out the serialized stream of addresses, data, and commands based on information received from the serial lines SI0 and SI1.

During a write operation, the row selection signals and column selection signals corresponding to the address that is to be accessed in storage area 110 are provided over the internal address bus to the select/row latch 330 and column decoder 335, respectively. The data as well as the voltage control signals used to write data into the selected location in the storage area 110 may be provided by the write circuit 311. The data that is to be stored may be provided to the write circuit 311 over the write data bus.

During a read operation, the row selection signals and column selection signals corresponding to the address of the location that is to be read from storage area 110 are provided over the internal address bus to the select/row latch 330 and column decoder 335, respectively. The data is read from the selected location in the storage area 110 and provided to the read circuit 313. The data is then provided to the shift register 319, which synchronously sends the data received from the read circuit 313 to the serial output lines SO0 and SO1.

Referring to FIG. 3A, the storage device 200 may include the processing system 105 and the memory management code 215. One embodiment of a storage device 200 that includes the processing system 105 and memory management code 215 is shown in FIG. 3B. In the embodiment of FIG. 3B, the storage device 200 includes a processor interface 340 that may be connected to an external processing system bus. The external processing system bus may include data signal lines, address signal lines, processing system select lines, or other lines that may be used to send and receive signals used by the processing system 105. These signals are provided from the processor interface 340 to the processing system 105 over an internal processing system bus. The memory management code 215 may be located in memory storage that is accessible by the processing system 105 over the internal processing system bus. The processing system 105 may execute the memory management code 215 in-situ and/or provide the memory management code to the host system 300 over the external processing system bus. The memory management code 215 may also be stored in storage area 110 and downloaded into memory storage of the processing system 105 or provided to the host 300 for execution.

Although the processing system 105 of the embodiment of FIG. 3B is connected to its own internal and external processing system buses, the processing system 105 may alternatively interface with one or more external components, such as host 300, using the signals provided through the serial protocol logic circuit 305 and device selection circuit 325. For example, a particular set of signals may be provided to the device selection circuit 325 to enable communication between an external component and the processing system 105. The communications with the processing system 105 may take place over the serial input lines SI0 and SI1 as well as the serial output lines SO0 and SO1. Additionally, or in the alternative, the processing system 105 may be enabled when information meeting a predetermined criterion, as determined by the compare circuit 317, is provided over the serial input lines SI0 and SI1. Embodiments of the storage device 200 other than those shown and described in connection with FIG. 3B may also be used in connection with the file content re-mapping operations described herein.

Figure 4:
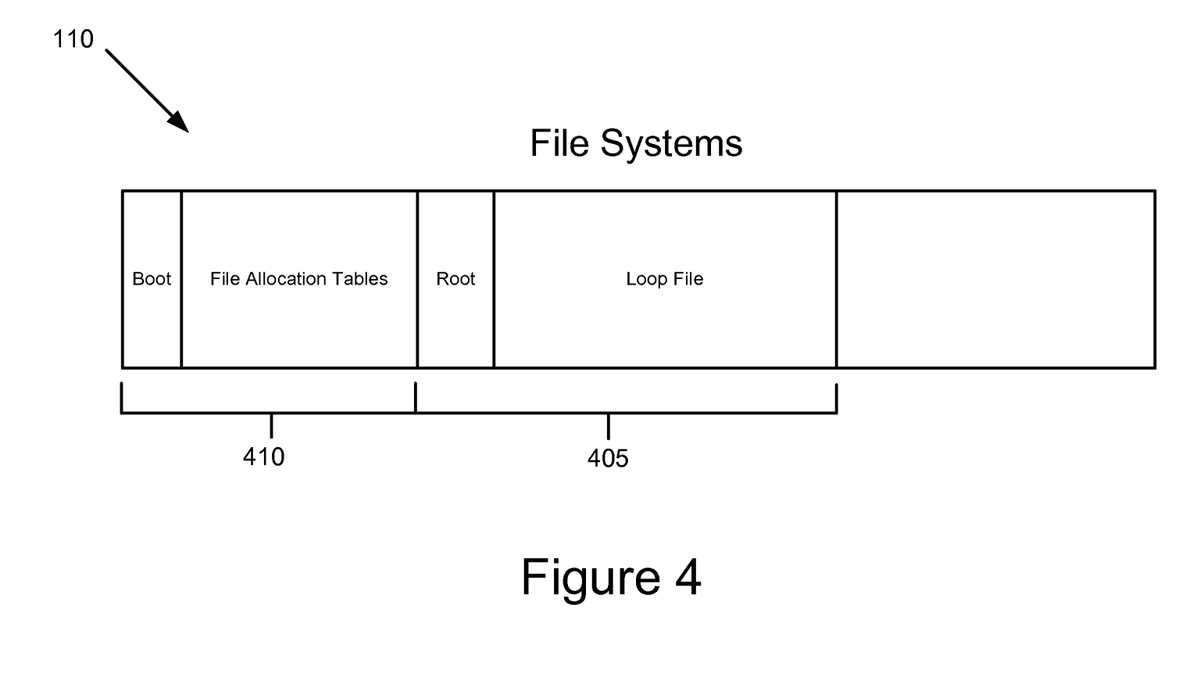
FIG. 4 shows one manner of organizing the first and second file systems of the systems illustrated in FIGS. 1-3A.

FIG. 4 shows one manner of organizing the first file system 155 and second file system 160 in the storage area 110. In this embodiment, the second file system 160 is in the form of a loop file 405 that is used to store the content delivered through the I/O interface 115 before it is available to the user. The loop file 405 contains within it a full file system. An operating system may mount the loop file 405 as if it is a complete file system. The loop file 405 may be visible to a user as an additional mount point (i.e., in Linux and Windows/Windows Mobile operating systems) or as a drive letter (i.e., in Windows and Symbian operating systems). The first file system 155 may be in the form of a native file system 410, such as an FAT32 file system, an FAT16 file system, an exFAT file system, an ext2/3 file system, or other native file system. For purposes of the following discussion, the native file system 410 will be described in connection with a FAT32 file system.

In a FAT file system, storage area 110 may be divided into identically sized clusters, which are small blocks of contiguous space. Cluster sizes may vary depending on the type of file system being used. Each file in the storage area 110 may occupy one or more of these clusters depending on its size.

A file system, such as an FAT file system, may include a file allocation table in the form of a list of entries that map to each cluster on a partition. Depending on the type of file system, each entry of the file allocation table may identify one or more of the following five items:

1. the cluster number of the next cluster in a chain;
2. a special end of clusterchain (EOC) entry that signals the end of a chain;
3. a special entry to mark a bad cluster;
4. a special entry to mark a reserved cluster;
5. a zero to note the cluster is unused.

Such a file system may also include a directory table. A directory table is a file that represents a directory. Each file or directory stored within the directory table may be represented by an entry in the table having a fixed byte size. Each entry may be used to record the name, extension, attributes (archive, directory, hidden, read-only, system and volume), the date and time of creation, the address of the first cluster of the file/directory's data, and/or the size of the file/directory.

File systems may also use extents to map to the files and/or directories that the file system manages. An extent may be used to reference a contiguous area of storage in a file system that is reserved for a file.

Figure 5:
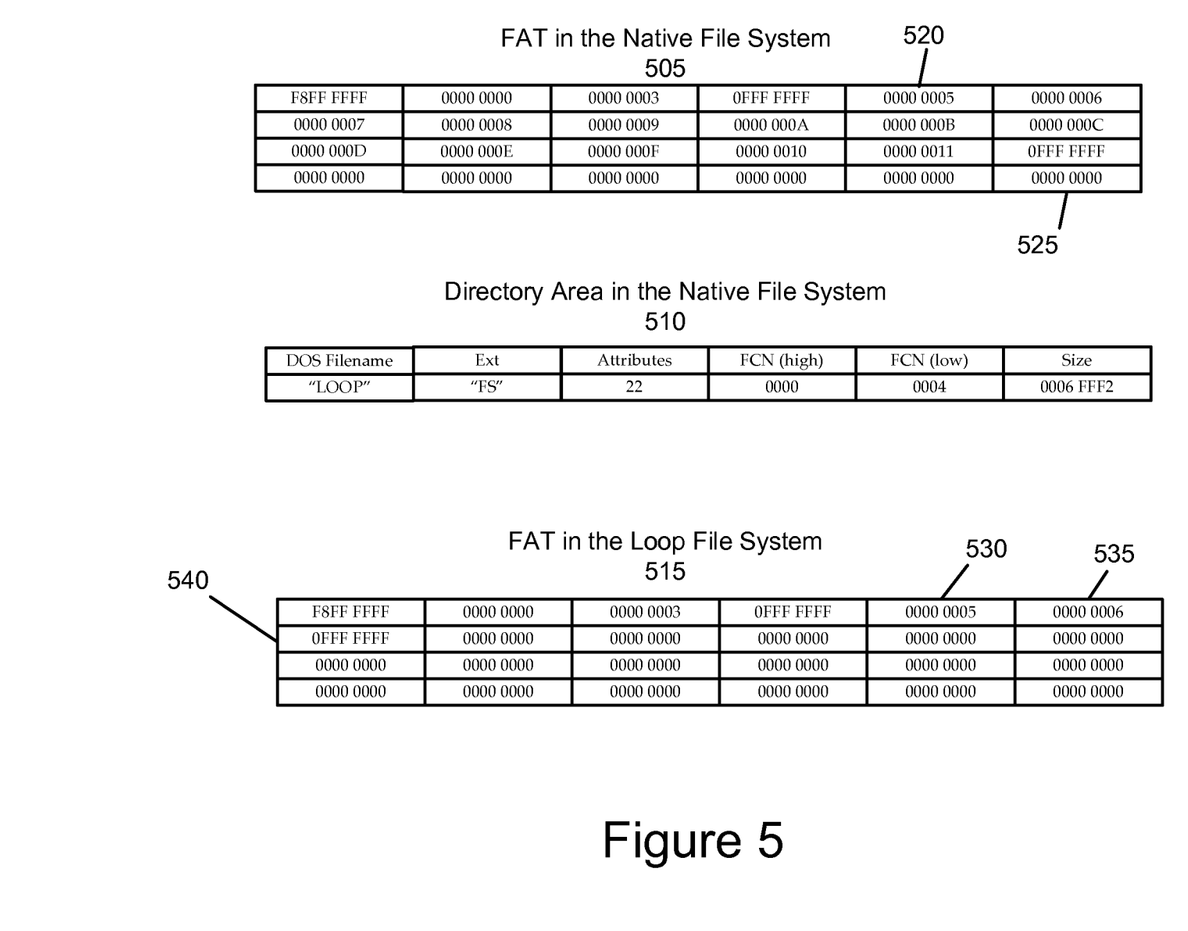
FIG. 5 shows one embodiment of a native file system that includes loop file.

FIG. 5 shows one embodiment of a native file system 410 that includes loop file 405. The file allocation table of the native file system 410 is shown at 505. The exemplary file allocation table 505 assumes a cluster size of 32K in both the native file system 410 and within the loop file 405. The chain beginning at cluster 4 of table 505 represents the loop file 405. In this example, the loop file 405 is a total of 14 clusters long and is represented by the directory table of the native filesystem 410 shown at 510. More particularly, loop file 405 begins at 520 and ends at 525.

The loop file 405 is marked hidden to prevent user interaction with the file. In one embodiment, TrustedFlash® may be deployed at the linear block addresses (LBAs) corresponding to the file extent (from logical clusters 4 and on) to prevent direct user access. TrustedFlash® technology empowers the storage device 200 to be the manager of digital rights to stored media content, thus giving consumers the freedom to use the storage device 200, and its content, on other supported devices without compromising the content protection system. The loop file 405 may still be deleted unless additional measures are deployed. This allows the user to recover the storage allocated to the loop file 405 and to make the overall file system appear consistent with the marked size of the storage device 200.

A file allocation table 515 is also provided in the loop file 405. The file allocation table 515 may use the same cluster size as the native file system 410. The exemplary file allocation table 515 includes one file with content at three clusters, shown here as 530, 535, and 540. While the file content in the illustrated loop file 405 also begins at cluster 0x0004 (530), the cluster numbers of the loop file 405 are designated relative to the beginning of the data area within the loop file 405. The cluster numbers do not match to the cluster numbers of the native file system 410.

Figure 6:
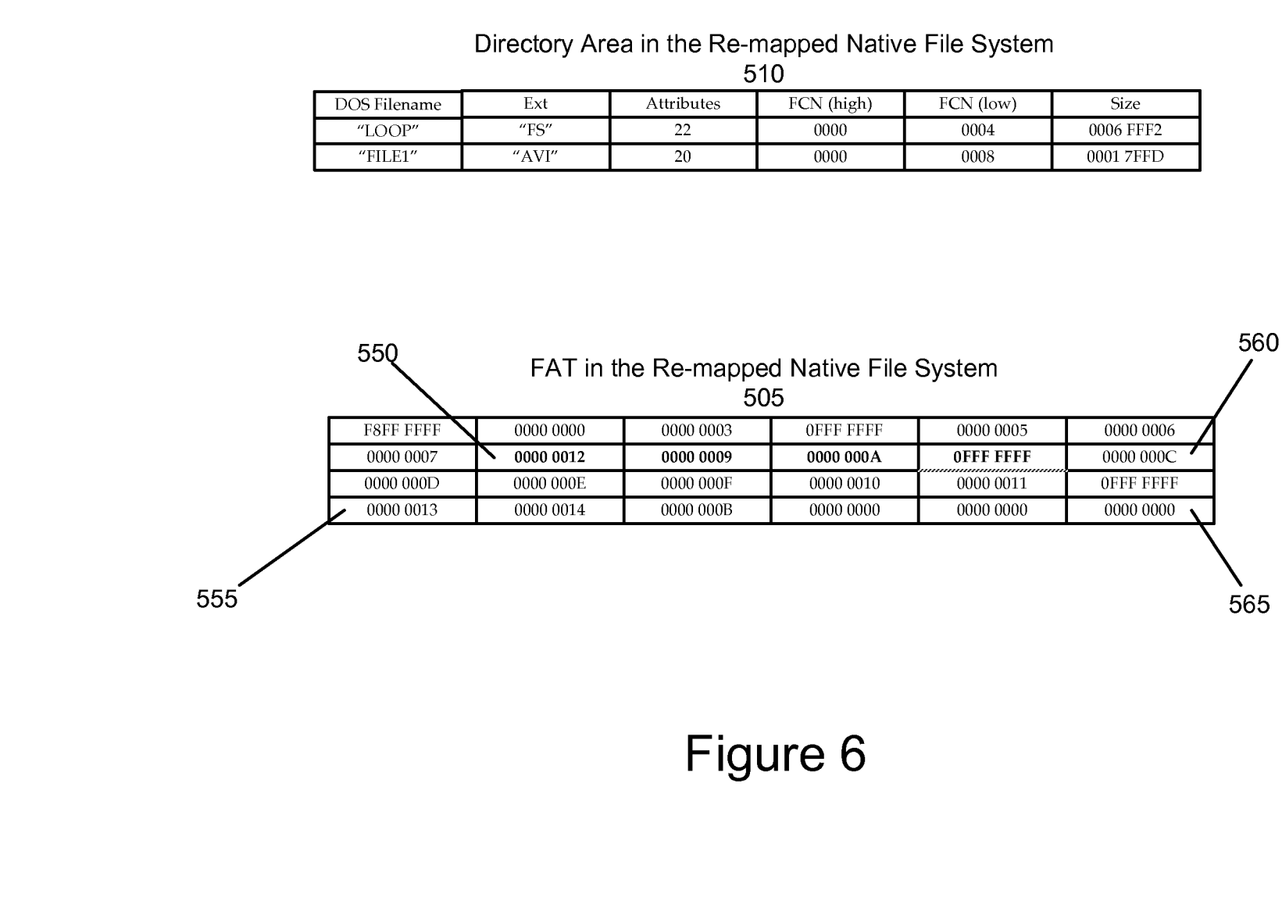
FIG. 6 shows the state of a directory area and file allocation table of the native file system after file content has been re-mapped to the native file system.

FIG. 6 shows the state of the directory area 510 and file allocation table 505 of the native file system 410 after the content 530-540 has been re-mapped to the native file system 410. In FIG. 6, the content has been logically re-mapped from the loop file 405 to the native file system 410. This logical re-mapping of file content 530-540 from the loop file 405 to the native file system 410 may be carried out by changing corresponding extents in the file allocation table 505 of the native file system 410 and adding a directory entry to the directory area 510. To this end, an extent is allocated in the directory area 510 of the native file system 410 and assigned a filename entry 545. Directory area 510 of FIG. 6 shows the directory area 510 when the new file is to be named FILE1.AVI. The new file, FILE1.AVI in this example is to begin at logical cluster 0x0008 and will have a file length of three clusters (the entirety of the content 530-540).

In the logically re-mapped file allocation table 505 of FIG. 6, the pointer at cluster 0x0007 (550) is changed so it is logically redirected to a newly allocated cluster 0x0012 (shown here at 555). The extent continues to cluster 0x0014 (shown here at 560), where it is redirected to cluster 0x000B (shown here at 565). The clusters at extents 0x0008 through 0x000A, containing file content 530-540, are thus allocated to the new file, FILE1.AVI. The extent containing the file content of the file to be moved is terminated and assigned to the file. Once the content has been logically re-mapped to the native file system 410, the extents in the file allocation table 515 of the loop file 405, which correspond to the logically re-mapped file of the loop file 405, may be removed. The logically re-mapped content is therefore no longer a part of the loop file 405.

The specific data shown in the tables of FIGS. 4 through 6 are for exemplary purposes only. The actual data in these tables will vary depending on the particular types of file systems employed as well as on the content of each of the file systems.

Figure 7:
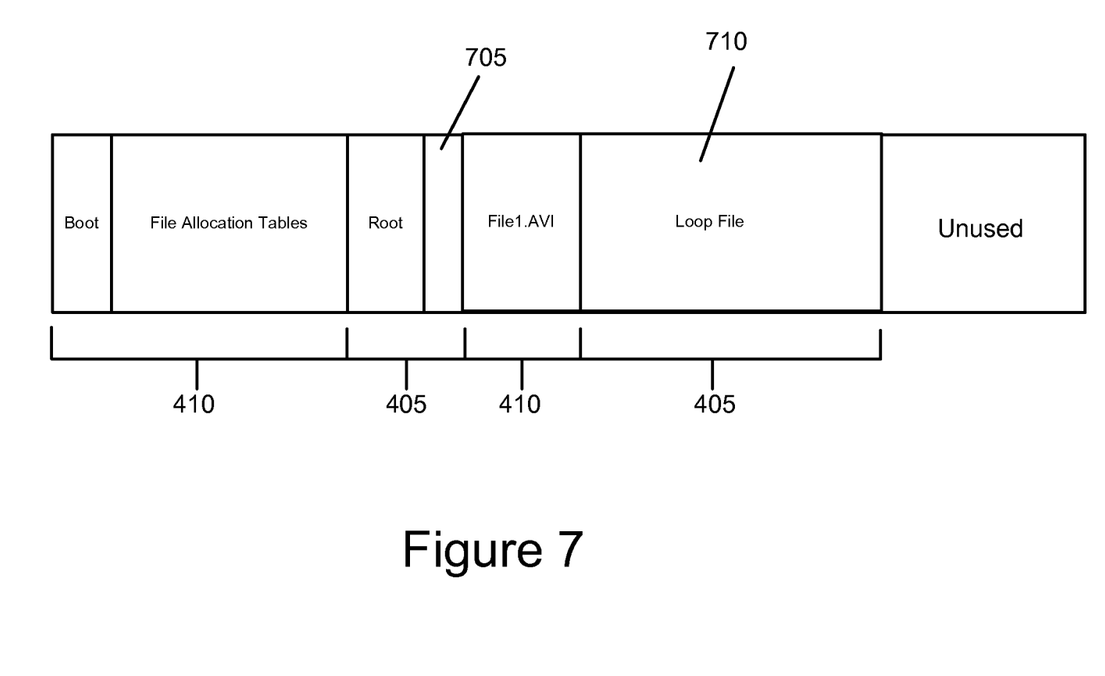
FIG. 7 shows the state of the storage area of the system after completion of the re-mapping operations.

FIG. 7 shows the state of the storage area 110 after completion of the re-mapping operations. As shown, the loop file 405 is now comprised of the root directory 700, loop file content area 705, and loop file content area 710. Content areas 705 and 710 are physically separated from each other by the content of File1.AVI, which is now located in the native file system 410. Since the content of the File1.AVI belongs to the native file system 410, the content is accessible to the user.

Figure 8:
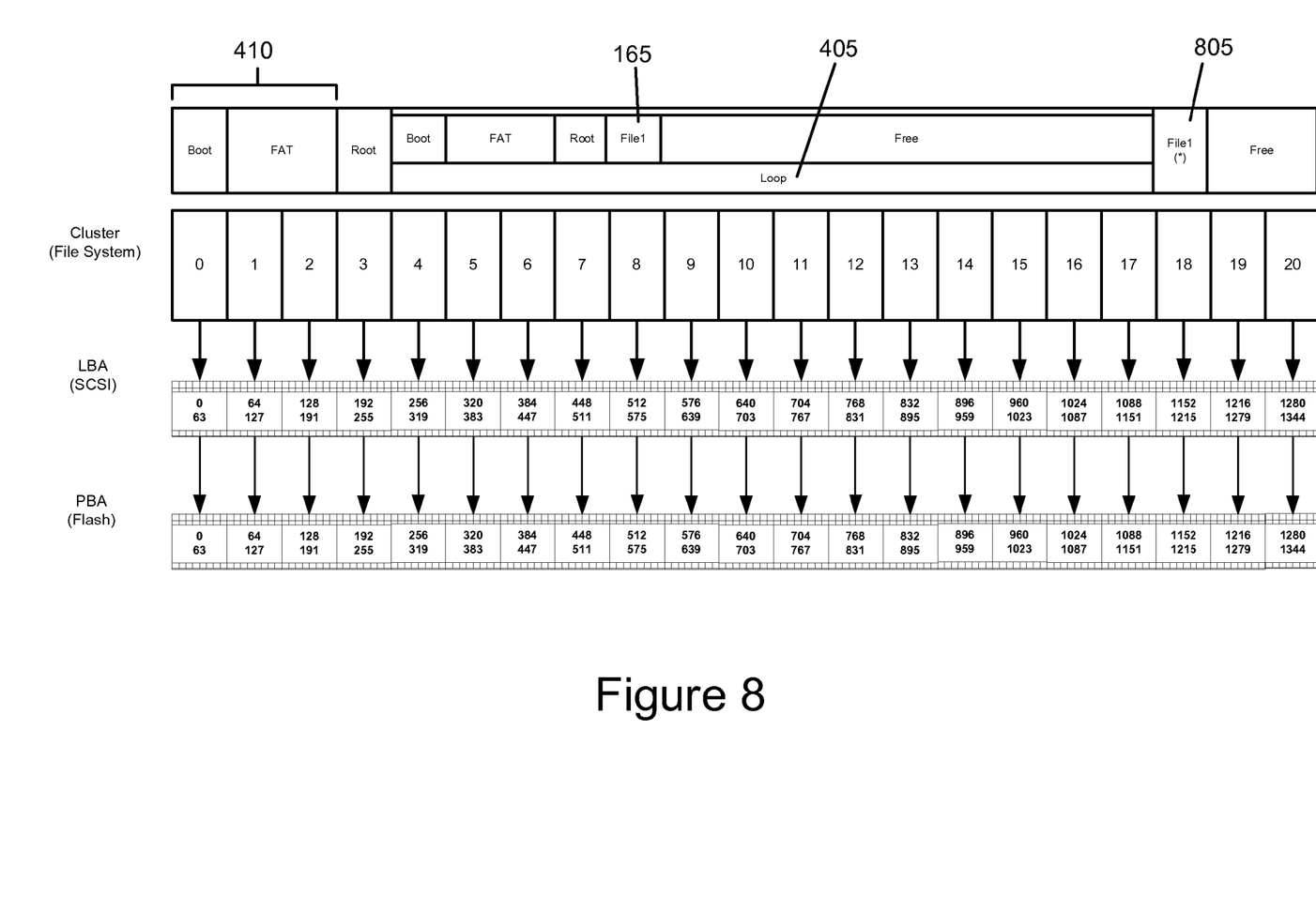
FIG. 8 shows the intermediate state of the system during file content transfer operations in which a logical block address-to-physical block address map is altered to carry out the content transfer.
Figure 9:
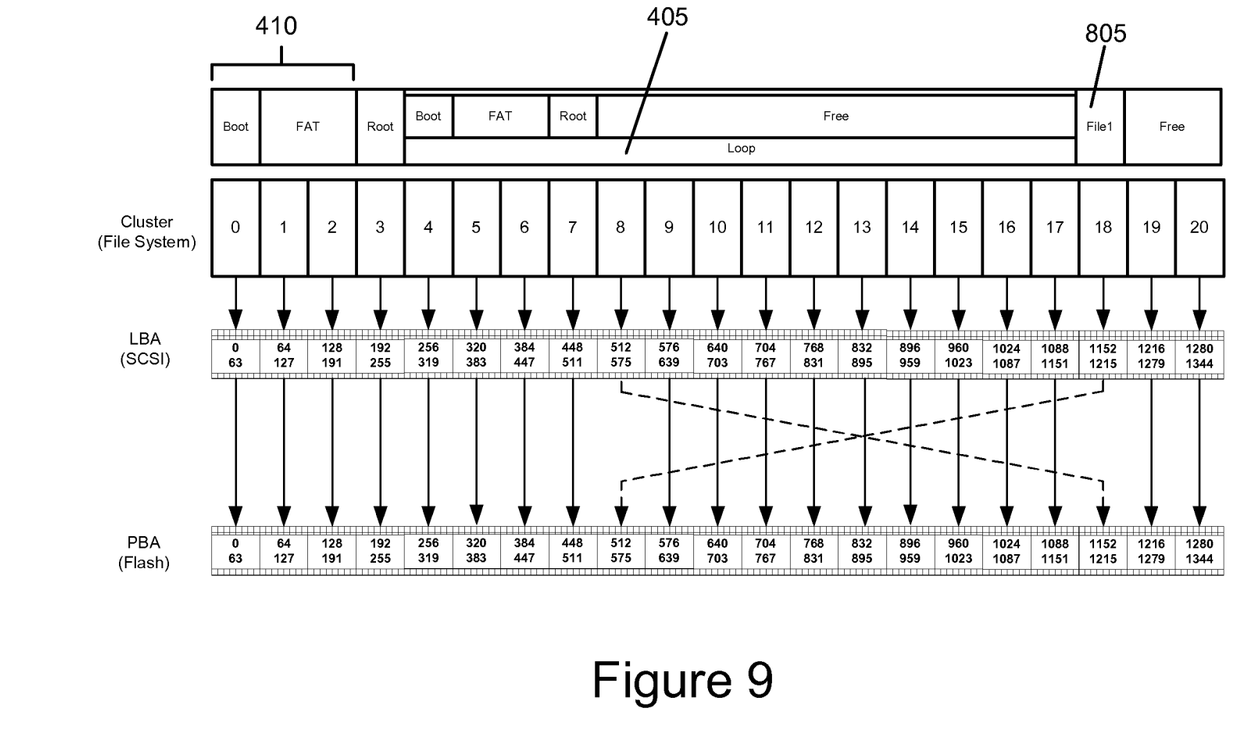
FIG. 9 shows the final state of the system upon completion of the file content transfer operations initially illustrated in FIG. 8.

FIGS. 8 and 9 show another mechanism for re-mapping data from a second file system, such as a loop file 405, to a first file system, such as a native file system 410. More particularly, the mechanism shown in FIGS. 8 and 9 involves a physical re-mapping of the content from the second file system to the first file system. The re-mapping shown in FIGS. 8 and 9 leverages the wear leveling mechanisms used in many non-volatile memory storage devices.

Flash devices may employ wear leveling mechanisms to ensure even distribution of page usage. This wear leveling mechanism may employ internally maintained mapping of LBAs to physical block addresses (PBA) in the physical block address table. The mappings may be updated based on an erase count analysis.

In the embodiment shown in FIGS. 8 and 9, the LBA-PBA mappings are grouped according to clusters. Clusters 0 through 2 are allocated to the native file system 410. Clusters 4 through 17 are allocated to the loop file 405. In this example, the content of file 165 is to be physically re-mapped from the loop file 405 to the native file system 410 using the logical-to-physical block address mappings.

As shown in FIG. 8, the content of file 165 is stored at cluster 8 of the loop file 405. Logical cluster 8 corresponds to logical block addresses 512-575, which correspond to physical block addresses 512-575. To re-map the content of file 165 to the native file system 410, the native file system 410 creates a new file entry 805 for the new file content at cluster 18 that effectively acts as a space holder for the file content that is to be re-mapped to the native file system 410. In FIG. 8, cluster 18 is located in a portion of the storage area 110 after the loop file 405. Cluster 18 corresponds to logical block addresses 1152-1215, which correspond to physical block addresses 1152-1215. The state of the LBA-to-PBA mappings in this intermediate state before completion of the re-mapping operation is shown in FIG. 8.

FIG. 9 shows the states of the native file 410, loop file 405, and LBA-to-PBA mappings after the re-mapping operations have been completed. In this example, the LBA-to-PBA internal mappings have been switched so the space holder at cluster 18 is now associated with the file content of file 165, and the entry for file 165 has been removed from the loop file 405. More particularly, the LBA-to-PBA mappings are switched so logical block addresses 512-575, which contain the file content to be transferred, are re-mapped to physical block addresses 1152-1215. The logical block addresses 512-575, formerly associated with the loop file 405 at cluster 8, have been re-mapped to physical block addresses 1152-1215. The contents of clusters 8 and 12 are thus swapped without a direct copy operation. Implementation of this type of swap operation may take on various forms. In one example, the swapping operation may be performed by a firmware command with, for example, logical block addresses or of logical block address sets as parameters.

The file content stored in the loop file 405 may be any type of file content, such as an executable program, an audio file, a video file, a text file, or the like. System 100 may be used when the file content is, for example, premium content subscribed to by the user. Once the premium content has been delivered to the system 100 during, for example, a background operation, the user may be notified of the availability of the content through the user interface 120. The user may then make a request for access to the content, defer access to the content, and/or refuse access to the content. Access to the content may, for example, require an active subscription to a service, entry of an access password, or similar authorization action. When the user carries out the actions associated with the request for access to the content, the triggering event may be produced, which initiates the re-mapping operations. The triggering event may also be generated when the user agrees to be billed for the content.

Many other contexts for the system 100 are also contemplated, without limitation. For example, a synchronization application may be executed by the host 300 and/or processing system 105 in a background operation and deliver content to the second file system 160 of the storage device 200 (i.e., removable and/or non-removable, non-volatile storage device). This content may be released to the first file system 155 when the user requests or initiates a full synchronization of data thereby generating the triggering event. In another example, premium media content may be delivered to a mobile device or a personal computer, but will only be made available to a user after the user consents to consume the content thereby generating the triggering event. In a still further example, a promotion or content from a play list may be pre-cached on the storage device from an Internet radio station or the like. At an appointed time, the triggering event may be generated and the content re-mapped so that it is accessible to the user.

Figure 10:
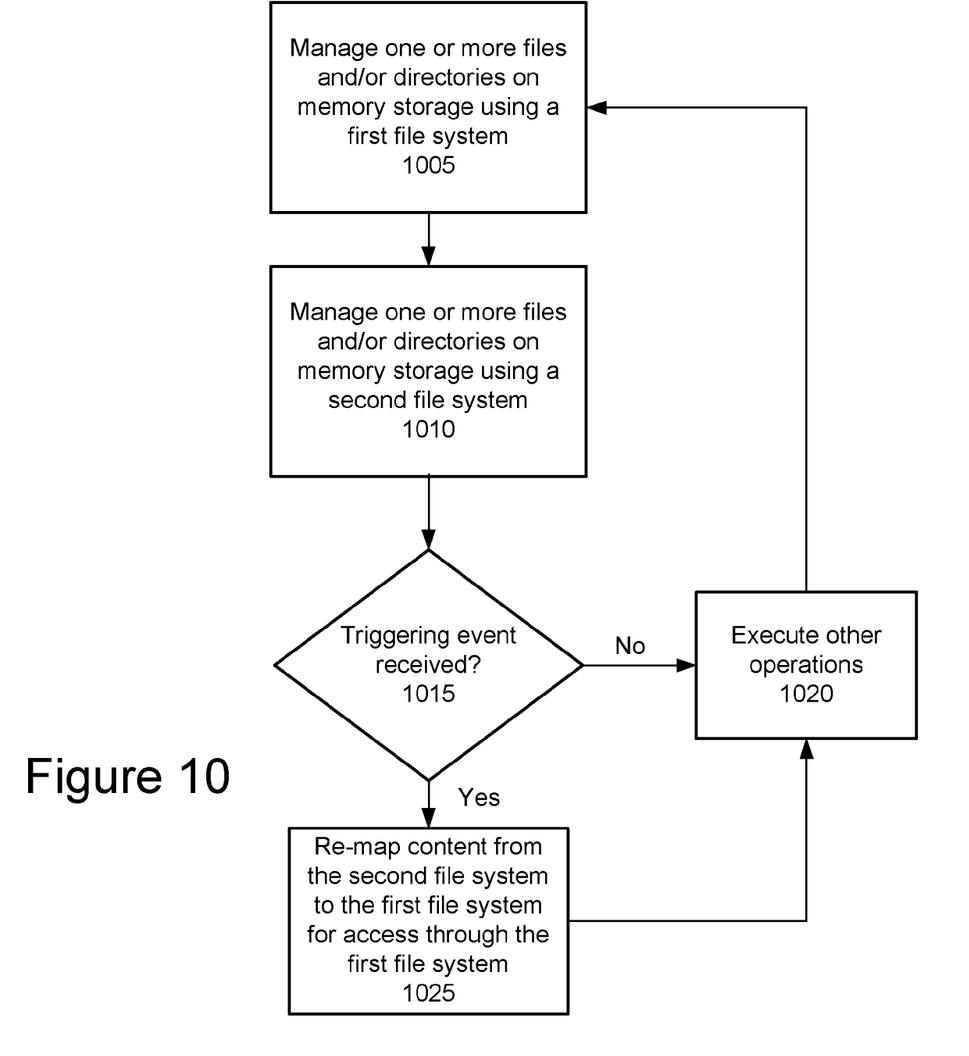
FIG. 10 is a flowchart showing the operation of a system that transfers stored content in response to a triggering event.

FIG. 10 is a flowchart showing the operation of a system that transfers stored content in response to a triggering event. As shown at 1005, a first file system is used to manage one or more files and/or directories on memory storage. A second file system is used to manage one or more files and/or directories on memory storage at 1010. A check is made at 1015 to determine whether a triggering event has been received. If a triggering event has not been received, other operations are performed at 1020, and the first and second file systems continue to manage their respective files and/or directories. If a triggering event has been received at 1015, content from the second file system is re-mapped to the first file system at 1025 for access through the first file system. The re-mapping operation at 1025 allows the first file system to access the content at the same physical location within the memory storage at which it was managed by the second file system.

In the system 100 and the method of FIG. 10, the time to copy file content from one file system to another is reduced to the time it takes to update a file allocation table. The number of writes used to copy the file content may be reduced often to a single write. Further, the power consumption used to copy the file content may be reduced in comparison with a direct copy operation. As noted above, in a direct copy or operation, all the file content is moved from the storage device 200 to the internal buffers of the host system 300, and from the internal buffers of the host system 300 back to the storage device. These operations may be reduced and/or eliminated in the system 100. Still further, the storage device 200 need not have additional storage for the copied content.

A variety of security mechanisms may be used to protect unauthorized access to the files of the storage device 200. As noted above, the storage device 200 may be in the form of a TrustedFlash® memory device available from SanDisk Corporation and operate in accordance with TrustedFlash® protocols. Further information about TrustedFlash™ can be found in U.S. patent application Ser. No. 11/314,411 (published as U.S. Patent Publication 2006/0242068A1), Ser. No. 11/557,028, and Ser. No. 11/322,812 (published as U.S. Patent Publication 2007/0043667A1), which are hereby incorporated by reference. Furthermore, the storage device 200 may include any combination of re-writable non-volatile memory or one-time programmable non-volatile memory. U.S. Pat. No. 7,062,602, which is hereby incorporated by reference, describes techniques suitable for making a one-time programmable memory behave like a re-writable non-volatile memory, the techniques being useful for both the content storage and/or for the control structures used by TrustedFlash® devices. U.S. patent application Ser. No. 11/529,582, which is also hereby incorporated by reference, describes the combination of both rewritable memory and one-time programmable memory in the same device. The rewritable memory may be used to add new keys to video stored in the one-time programmable memory.

In the TrustedFlash® approach, the file content is encrypted and decrypted using a secure key (CEK) contained within the storage device 200, which is not accessible outside of device. The user may interact with the storage device 200 by authenticating to the device and, when authenticated, a system agent within the device creates and manages the allowed user permissions to the content on a user-by-user basis and on a content-file-by-content-file basis (or group of files).

The methods and descriptions of the foregoing systems may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers. The memory may retain an ordered listing of executable instructions for implementing logical functions. A logical function may be implemented through digital circuitry, through source code, through analog circuitry, or through an analog source such as through an analog electrical signal.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more wires, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A storage device with file system mapping, comprising:
a first portion of a memory comprising a first file system containing one or more files and/or directories accessible to a user;
a second portion of the memory comprising a second file system containing one or more files that are inaccessible to the user;
a processing system; and
control logic operative to interface with the processing system and retain in place selected data of a selected file of the second file system;
wherein the processing system is configured to re-map the selected data from the selected file in the second file system, that is inaccessible to the user, to a file in the first file system that is accessible to the user, so that access to the selected data of the selected file in the second file system is provided to the user through the first file system, wherein the physical location in memory of the selected data that is re-mapped remains unchanged at a first physical block address of the memory, wherein the file in the first file system is mapped to a logical block address which is mapped to a second physical block address of the memory, and wherein the processing system is configured to re-map the selected data from the selected file in the second file system to the file in the first file system by re-mapping the logical block address to the first physical block address of the memory.

2. The storage device of claim 1, wherein the first file system is organized as a FAT32 file system.

3. The storage device of claim 1, further comprising memory management code that is executable by the processing system to respond to a triggering event by re-mapping file allocation extents for the selected data of the selected file so that the selected data is removed from the selected file and inserted into the first file system while retaining the selected data at its original physical location on the storage device for access through the first file system.

4. The storage device of claim 1, wherein the re-mapping which the processing system is configured to perform includes a logical re-mapping.

5. The storage device of claim 1, wherein the first and second file systems in the memory are multiple nested file systems.

6. A system comprising:
a memory;
a first file system configured to manage a first portion of the memory, the first portion containing one or more files and/or directories;
a second file system configured to manage a second portion of the memory, the second portion containing content of one or more files; and
a processing system operative, in response to a triggering event, to re-map a portion of content from a selected file in the second file system, that is inaccessible to the user, to a file in the first file system that is accessible to the user, while the content of the selected file in the second file system is retained at its original physical location in the memory so that the portion of the content of the selected file that is remapped is accessible through the first file system at its original physical location in the memory, wherein the file in the first file system is mapped to a logical block address, and wherein the processing system is operative to re-map the portion of content from the selected file in the second file system to the file in the first file system by a change in physical block address to which the logical block address is mapped.

7. The system of claim 6, wherein the processing system is operative to re-map content of a selected file and wherein the processing system is operative to re-map an entirety of the content of the selected file.

8. The system of claim 6, wherein the processing system is operative to re-map less than all of the content of the selected file to the first file system thereby leaving residual content in the second file system, and wherein the processing system is operative to deallocate the residual content from the selected file of the second file system so that physical storage occupied by the residual content is made available for allocation by the processing system to the first and/or second file systems.

9. The system of claim 6, wherein the memory comprises non-volatile memory.

10. The system of claim 9, wherein both the first and second file systems are present on the non-volatile memory.

11. The system of claim 10, wherein the processing system is integrated with the non-volatile memory.

12. The system of claim 6, further comprising memory management code that is executable by the processing system to re-map the content from the selected file of the second file system to the first file system, in response to the triggering event.

13. The system of claim 12, wherein the memory management code is stored in the memory.

14. The system of claim 13, wherein the processing system is integrated with the memory.

15. The system of claim 6, wherein the second file system comprises a loop file.

16. The system of claim 15, wherein the first file system comprises a native file system.

17. The system of claim 6, wherein the processing system logically re-maps the content from the selected file of the second file system to the first file system by changing file allocation extents in the first and second file systems so that the content is added to a file of the first file system and removed from a file of the second file system.

18. The system of claim 6, wherein the processing system is operative to physically re-map the content by switching mappings between logical block addresses and physical block addresses of the memory.

19. The system of claim 6, wherein the content comprises media file data.

20. The system of claim 19, wherein the triggering event comprises a billing event.

21. The system of claim 19, wherein the triggering event comprises a timing event.

22. The system of claim 6, wherein the re-mapping which the processing system is operative to perform includes a logical re-mapping.

23. The system of claim 6, wherein the first and second file systems are multiple nested file systems.

24. A method comprising:
storing one or more files and/or directories in a first portion of a memory that is included in a first file system;
storing content of one or more selected files in a second portion of the memory that is included in a second file system;
responding to a triggering event by re-mapping a portion of content from a selected file in the second file system to the first file system that is inaccessible to the user, to a file in the first file system that is accessible to the user, while retaining the content of the selected file at its original physical location in the memory so that the portion of the content of the selected file that is remapped is provided to the user through the first file system at its original physical location in the memory, wherein the file in the first file system is mapped to a logical block address, and wherein the re-mapping the portion of content from the selected file in the second file system to the file in the first file system comprises changing a physical block address to which the logical block address is mapped.

25. The method of claim 24, wherein the content is stored in the selected file of the second file system, and wherein an entirety of the content of the selected file is re-mapped to the first file system.

26. The method of claim 24, wherein the re-mapping comprises logically re-mapping content of the selected file from the second file system to the first file system by changing file allocation extents in the first and second file systems so that the content of the selected file is added to a file of the first file system and removed from the second file system.

27. The method of claim 24, wherein the re-mapping comprises physically re-mapping content of the selected file by switching mappings between logical block addresses and physical block addresses of the memory for the content of the selected file of the second file system.

28. The method of claim 24, wherein the re-mapping further comprises changing logical block addresses to which the file in the first file system is mapped.

29. The method of claim 24, wherein the first and second file systems are multiple nested file systems.

* * * * *